Dec. 25, 1951     G. L. MEYERS     2,580,119

PILLOW BLOCK

Filed Oct. 31, 1945

*INVENTOR.*
GEORGE L. MEYERS
BY
Oberlin & Limbach
ATTORNEYS

Patented Dec. 25, 1951

2,580,119

UNITED STATES PATENT OFFICE 2,580,119

PILLOW BLOCK

George L. Meyers, Willoughby, Ohio, assignor, by mesne assignments, to The Ohio Rubber Company, Willoughby, Ohio, a corporation of Delaware Application October 31, 1945, Serial No. 625,755

6 Claims. (Cl. 308—26)

The present invention relates to bearings for shafts and the like of the type commonly known as pillow blocks, the principal objects being to provide a bearing of this type which will be of simple and inexpensive construction, which will permit of ready alignment where, as usual, two or more such bearings are employed, and which will include vibration dampening means so as to insure quiet operation of the shaft supported by the bearings.

Still another object is to incorporate in the bearing means whereby the same will be continuously supplied with lubricant.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
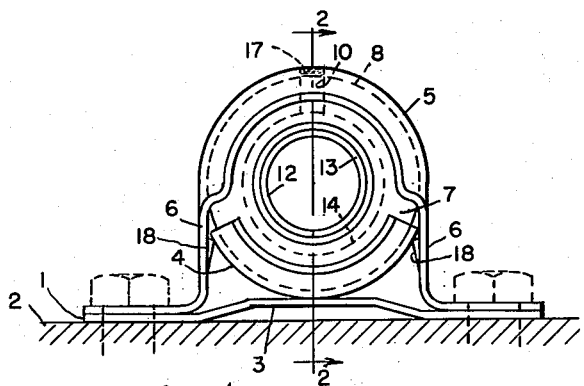
Fig. 1 is a side elevation of a bearing in the form of a pillow block embodying my present improvements.
Figure 4:
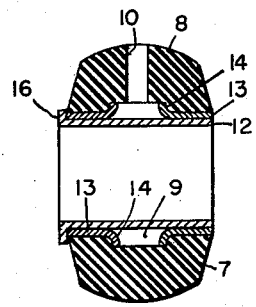
Fig. 4 is a transverse section of certain elements of the bearing taken on the same plane as that of Fig. 2 but showing such elements as they appear prior to assembly.
Figure 2:
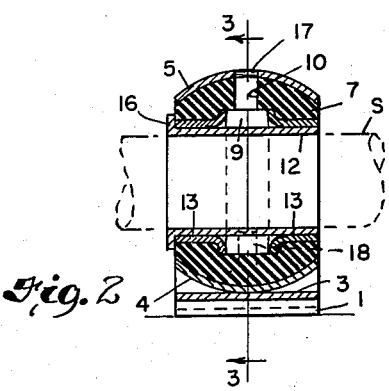
Fig. 2 is a central vertical section thereof taken on the plane indicated by the line 2—2, Fig. 1.
Figure 3:
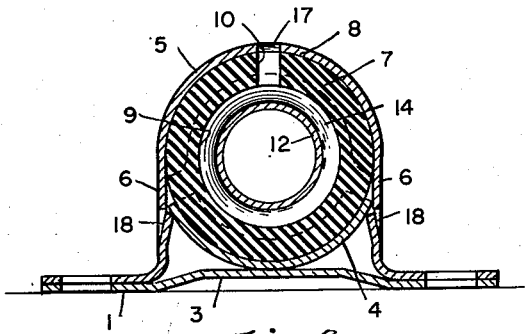
Fig. 3 is a longitudinal vertical section taken on the plane indicated by the line 3—3, Fig. 2.

Referring to Figs. 1, 2 and 3, it will be seen that the bearing is supported on a base 1 which will preferably consist of a plate stamped from sheet metal adapted for attachment to any suitable support 2. The intermediate portion 3 of such plate is preferably slightly raised above the end portions whereby the plate is thus attached, and fixedly secured to such central raised portion is an arcuate clamping member 4 which will likewise preferably consist of a stamping and which may be conveniently thus secured to the base plate by being spot welded at its midpoint thereto. Secured to support 2 by the same attaching means as such base plate is a complementary clamping member 5 of general U-shape having sides 6 adapted to fit over said clamping member 4. The arcuate extent of the respective clamping members is such that when the second is secured in place over the first their inwardly directed faces will approximately but not quite form a complete circle, such faces being transversely curved about an approximately common center.

When assembled together the opposed arcuate clamping members thus provided are designed to secure therebetween an annular member 7 of resiliently deformable material, for example vulcanized rubber, either natural or synthetic, and preferably of oil-resistant character. As initially molded, said resiliently deformable annular member 7 is formed with its outer face 8 of a diameter somewhat larger than the diameter of the opposed arcuate faces of the clamping members and with a transverse curvature approximately the same as that of said clamping members. Said member 7 is also formed interiorly with an encircling depression or groove 9 located midway between its sides with which a radial passage 10 that extends to its outer face communicates.

Figure 5:
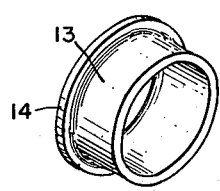
Fig. 5 is a perspective view of one of the component elements of the bearing.

The bearing proper consists of a bushing 12 which may be made of any of the usual metals employed in the construction of bearings, but will desirably be of pervious character so that oil or other lubricant supplied to the outer surface thereof may pass through to the inner surface of said sleeve and thus lubricate the shaft S journalled therein. Exteriorly press fitted onto bearing sleeve 12 are two rings 13 illustrated separately in Fig. 5, each of which is provided with an outwardly directed flange 14. The aggregate width of said rings is substantially less than the length of the sleeve so that when the rings are applied to the latter with the flanges directed toward each other, they will define an annular lubricant retaining chamber corresponding in location with the encircling groove 9 formed in the inner face of resiliently deformable annular member 7. If desired, although not necessarily, sleeve 12 may be provided at one end with an outwardly directed flange 16 against which the adjacent ring 13 seats and is thereby properly located.

In assembling the parts just described, the resiliently deformable annular member 7 is simply snapped over the rings, said member having sufficient resilience to permit this being done, so as to bring the encircling groove on its inner face into engagement with the flanges on said rings. Thereupon the parts in question thus assembled are placed between the arcuate clamping members, which are separated for the purpose, it being noted that the upper clamping member has a central opening 17 with which the radial passage 10 in the resiliently deformable annular member 7 is brought into register. Upon now drawing the clamping members together said annular member 7 will be forcibly compressed upon the sleeve 12 upon the rings 13 interposed between said member and sleeve and thus secure the latter firmly in place subject only to such movement as the yielding character of the annular member thus compressed will permit.

It should be noted that before the clamping members are thus drawn together the annular resiliently deformable member 7 is free to oscillate about an axis passing through the center to which the transversely curved faces of said member and of the clamping members are drawn. As a result the bearing, or plurality of bearings where more than one are employed, will automatically align themselves with the axis of the shaft S.

It will be further noted that the sides 6 of the upper clamping member 5 are formed with inwardly directed, struck-up lugs 18, which are so disposed that in the assembled condition of the parts their outer ends will bear against and support the adjacent portions of the lower clamping member 4. Said lugs are in the form of tongues and may either be sprung over the ends of said member 4 in assembling the parts, or be bent inwardly after assembly.

It will be understood of course that lubricant may be introduced through the opening 17 and thus supplied to the annular space within the bearing either directly or by means of any suitable fitting or connection.

From the foregoing construction it will be seen that my improved pillow block is of extremely simple construction, comprising a minimum number of easily assembled parts. At the same time full provision is made for self-alignment of the bearing and in finally assembled condition a sufficiently yielding support for the bearing sleeve and thus for the shaft is provided so as effectively to dampen vibration.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a shaft bearing, the combination of opposed arcuate clamping members, said members having their inwardly directed faces transversely curved about an approximately common center; an annular member of resiliently deformable material circumferentially fitted to such faces; a bushing supported within said annular member; two axially spaced rings interposed between the latter and said bushing, said rings having outwardly directed flanges adjacent their inner ends, whereby a lubricant-retaining chamber is provided around said bushing, and said annular member being capable of being snapped over such flanges into seated position on said rings; and means adapted to draw said clamping members together.

2. In a shaft bearing, the combination of a base; an arcuate clamping member attached at its center to said base; a complementary clamping member of general U-shape having sides adapted to fit over said first clamping member and formed for attachment to said base, the sides of such second clamping member being formed with inwardly directed lugs adapted to engage and laterally support said first clamping member, said first clamping member and the arcuate portion of said second member having their inwardly directed faces transversely curved about an approximately common center; an annular member of resiliently deformable material circumferentially fitted to such faces; a bushing supported within said annular member; and means adapted to draw said clamping members together.

3. In a shaft bearing, the combination of opposed arcuate clamping members, said members having their inwardly directed faces transversely curved about an approximately common center; a unitary annular member of resiliently deformable material circumferentially fitted to such faces and conforming to the diametrically opposite portions of such transverse curve of such faces; an annular groove in the inner peripheral surface of said annular resiliently deformable member; a bushing supported within said annular member; two axially spaced rings interposed between the latter and said bushing, the space between said rings communicating with said annular groove; a lubricant supply passage communicating with said groove; and means adapted to draw said clamping members together.

4. In a shaft bearing, the combination of opposed arcuate clamping members, said members having their inwardly directed faces transversely curved about an approximately common center; a unitary annular member of resiliently deformable material held between said clamping members and having an outer peripheral surface of substantial width conforming to diametrically opposite portions of such transversely curved faces, the inner periphery of said annular member being cylindrical; a cylindrical bushing circumferentially supported within said annular member; and means adapted to draw said clamping members together, said resiliently deformable annular member filling the space between said clamping members and said bushing.

5. In a shaft bearing, the combination of a base; an arcuate clamping member attached to said base with the two arcuate ends of said member extending free; a complementary clamping member of general U-shape having sides adapted to fit closely over such ends of said first clamping member and formed for attachment to said base, said first clamping member and the arcuate portion of said second clamping member having their inwardly directed faces transversely curved about an approximately common center; an annular member of resiliently deformable material held between said clamping members and having an outer peripheral surface of substantial width conforming to such transversely curved faces; a bushing supported within said annular member; and means adapted to draw said clamping members together.

6. In a shaft bearing, the combination of opposed arcuate clamping members, said members having their inwardly directed face transversely curved about an approximately common center; a unitary annular member of resiliently deformable material held between said clamping members and having an outer peripheral surface of substantial width conforming to diametrically opposite portions of such transversely curved faces; an annular groove in the inner peripheral face of said annular resiliently deformable member; a radial passageway through said resiliently deformable member leading to said groove for the introduction of lubricant thereto; a porous bushing supported within said annular resiliently deformable member and closing off said groove therein; and means adapted to draw said clamping members together.

GEORGE L. MEYERS.

REFERENCES CITED

The following references are of record in the file of this patent:

UNITED STATES PATENTS

| Number | Name | Date |
|---|---|---|
| 1,483,903 | Masury | Feb. 19, 1924 |
| 2,138,659 | Kindig | Nov. 29, 1938 |
| 2,149,983 | Smith | Mar. 7, 1939 |
| 2,175,978 | Swingle | Oct. 10, 1939 |
| 2,196,388 | Ewald | Apr. 9, 1940 |
| 2,230,472 | Sullivan | Feb. 4, 1941 |
| 2,258,040 | Young | Oct. 7, 1941 |
| 2,318,477 | Firth | May 4, 1943 |
| 2,439,267 | Shafer | Apr. 6, 1948 |